(12) United States Patent
Bermudez et al.

(10) Patent No.: US 7,609,823 B2
(45) Date of Patent: Oct. 27, 2009

(54) HIGH CAPACITY ADVANCED 8YY MASS CALLING EVENT NETWORK ARCHITECTURE

(75) Inventors: Todd R. Bermudez, Cincinnati, OH (US); James Caldwell, De Mossville, KY (US); Danny Chism, Erlanger, KY (US); Roy DeFrain, Pickerington, OH (US); Andrew Grigg, Cincinnati, OH (US); Kirk Warrenburg, Cincinnati, OH (US); William Yates, Cincinnati, OH (US)

(73) Assignee: AT&T Corp, New York, NY (US)

( * ) Notice: Subject to any disclaimer, the term of this patent is extended or adjusted under 35 U.S.C. 154(b) by 773 days.

(21) Appl. No.: 11/253,526

(22) Filed: Oct. 19, 2005

(65) Prior Publication Data

US 2007/0116191 A1     May 24, 2007

(51) Int. Cl.
*H04M 11/00*     (2006.01)

(52) U.S. Cl. .................................................. 379/92.01
(58) Field of Classification Search .... 379/92.01–92.03
See application file for complete search history.

(56) References Cited

U.S. PATENT DOCUMENTS 5,675,635 A * 10/1997 Vos et al. .................. 379/92.03
5,970,385 A * 10/1999 Pykalisto ................ 379/92.02
6,016,337 A * 1/2000 Pykalisto ................ 379/92.02

* cited by examiner

*Primary Examiner*—Stella L Woo (57) ABSTRACT

A telephone network voting system is configured to process a large number of calls. The system receives telephone ballots cast by voters by dialing an 8YY telephone number. The telephone ballots are received by network edge switch (NES) from a local exchange carrier (LEC), and sequentially received calls are routed to a repeating sequence of segmentation databases (SDs). The SDs are configured for routing calls in a sequentially received series of 8YY calls to a repeating sequence of said NCPs. Switches are mapped to NCPs to minimize congestion on A and AA links. Call announcements are stored in disk cache.

12 Claims, 6 Drawing Sheets

HIGH CAPACITY ADVANCED 8YY MASS CALLING EVENT NETWORK ARCHITECTURE

FIELD OF THE INVENTION

The present invention relates generally to a network-based vote-casting and tallying system and, more particularly, to a network balloting system capable of handling a large volume of voting calls spread over a large geographic area or network space.

BACKGROUND OF THE INVENTION

Electronic voting techniques are often used to collect public opinion from an audience during an event. For example, members of an audience may be asked to submit their individual opinions via a communications or computer network during a televised entertainment event or during a political event. The individual opinions may then be analyzed to determine the aggregate opinions of the audience.

Frequently, voting is triggered by a live, broadcast announcement. A televised talent show may ask the audience to vote on a preferred performer, providing one or more toll-free (8YY) numbers for audience members to call to place a vote. Vast numbers of votes are therefore placed nearly simultaneously.

The callers may each use the one or more toll-free 8YY numbers (such as a number with an 800 area code) for voting. In one scenario, a single 8YY number per candidate is assigned. In that case, a call to a number indicates a vote for a candidate. A voting caller is played a courtesy announcement affirming receipt of the vote.

In another scenario, a single 8YY number is used for the entire election. In that embodiment, an interactive voice response unit (IVR) is used to prompt the caller to vote for the desired candidate by, for example, pressing designated keys on a touchtone phone.

In a typical scenario, a media company interested in staging such a television viewer-based voting event contracts with a network provider to provide one or more 8YY numbers that audience members can call from their residential phones to place a vote.

Figure 1:
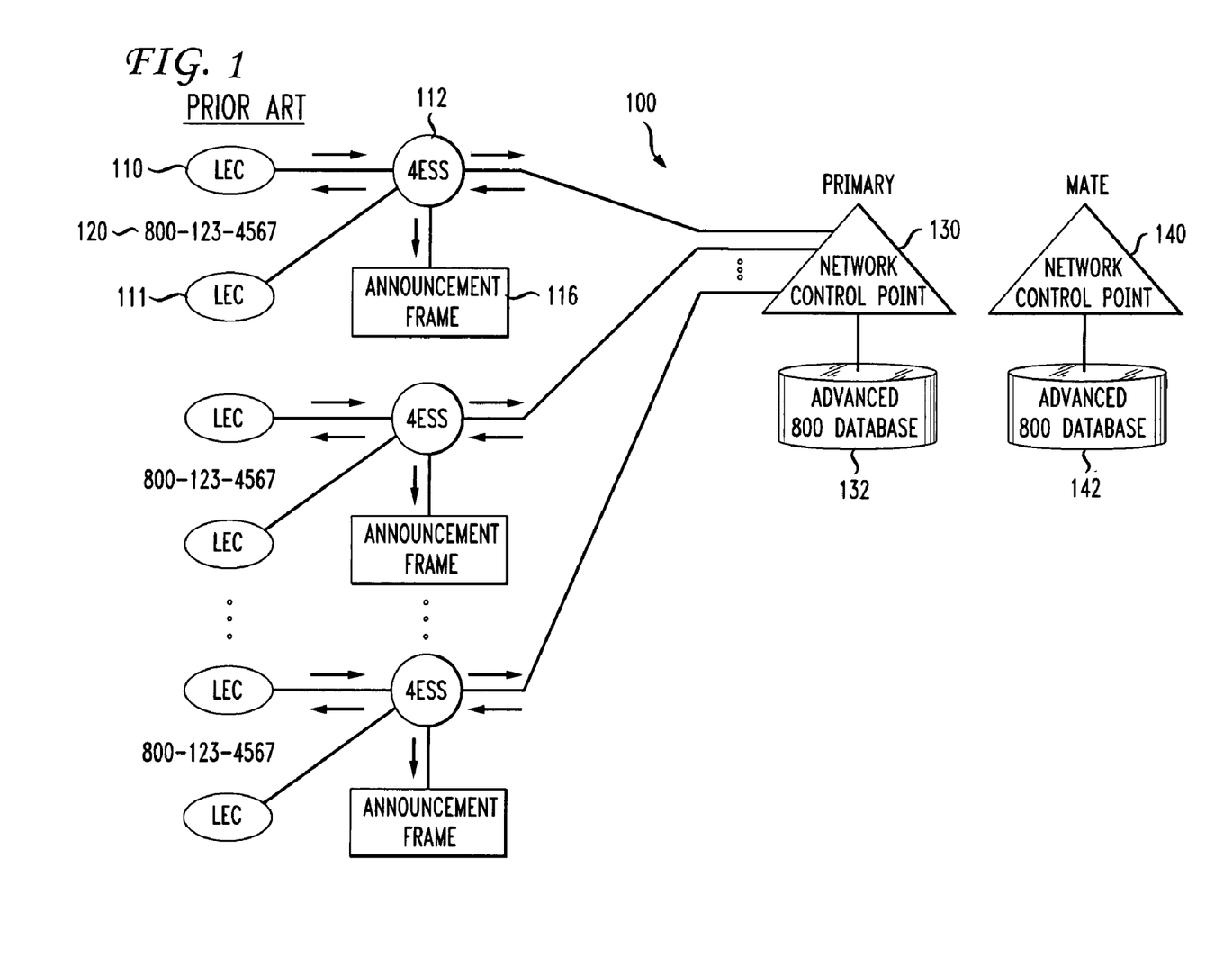
FIG. 1 is a schematic representation a prior art communications network.

An example of a prior art system 100 is shown in FIG. 1. Calls from each dialed 8YY number (e.g., 120, 121) used during the mass calling event are routed by a local exchange carrier (e.g., 110, 111) to 4ESS switches such as switch 112, to a single pair of network control points 130, 140 (NCPs) to receive call instructions. In one present implementation of the system, there are 140 such 4ESS switches in the system.

Based on responses from the NCPs 130, 140 received at the 4ESS switch 112, calls are then routed to an announcement resource 116 at the originating 4ESS switch to receive a courtesy response announcement. The announcement resource 116 includes S and D set announcement frames, both of which are utilized in servicing the mass calling event.

Call capacity of an architecture such as that shown in FIG. 1, including 140 4ESS switches, is approximately 840K calls per hour. Call throughput is limited by the fact that all calls are routed to the single NCP pair 130, 140 during call processing, and announcement resources are not equally distributed between D and S sets. The inventors have found that, during a mass calling event, the single NCP pair, together with unbalanced use of the S and D announcement resources, creates a bottleneck.

Several improvements have been implemented to increase throughput in the above-described system. Improvements to three network elements within the AT&T Switched Network have been implemented: the 4ESS switch, Advance 800 Network Control Point, and the D and S set ISAIC announcement frames.

Figure 2:
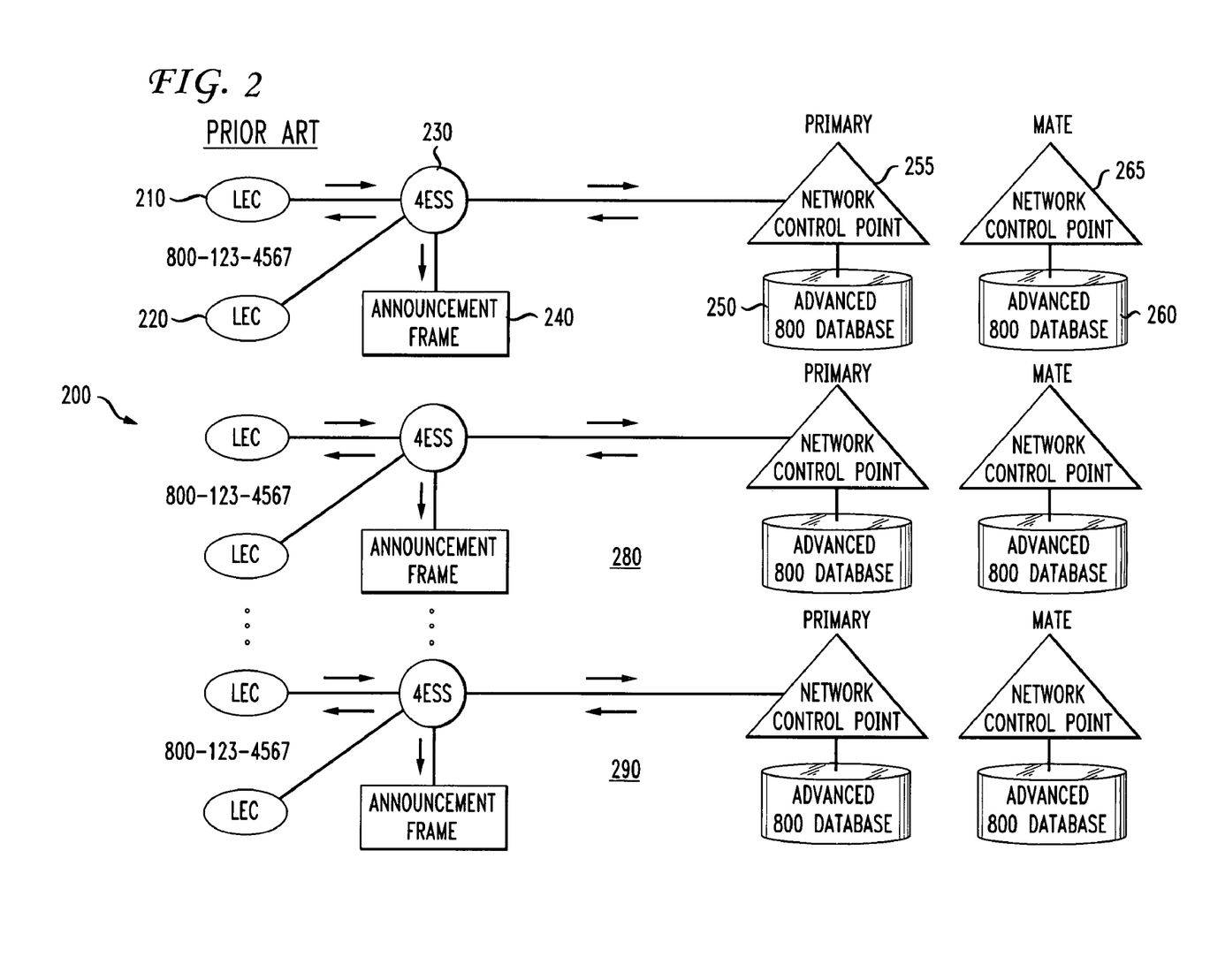
FIG. 2 is a schematic representation of a prior art communications network.

An improved high capacity network architecture 200 for 8YY mass calling events is shown in FIG. 2. The high capacity A800 Service architecture 200 utilizes several elements to increase call completions during a mass calling event. First, the architecture includes dedicated mapping of traffic from a 4ESS switch such as switch 230 to an NCP pair such as pair 255, 265. The subsystems 280, 290 are similarly mapped from 4ESS switches to dedicated NCP pairs. Sixteen pairs of NCPs (three of which are shown in FIG. 2) are utilized in one exemplary system. Originating 8YY traffic is thereby evenly distributed to those NCP pairs.

The capability to evenly distribute 8YY traffic from originating switch to Network Control Point is provided by a 10 digit dialed number translation table (not shown) within each 4E switch 230. That table associates the dialed 8YY number to a network address (point code). The address is used to route 8YY calls to a Network Control Point for further call processing. The table allows network engineers to match call volumes of each dialed number and originating 4E to the corresponding capacity of a Network Control Point in the network. The translation table containing the switch-to-NCP relationship is produced and provisioned into the network prior to the start of each unique mass calling event.

Another system enhancement is the replication of the account record within each A800 NCP database 250, 260 in the network. All NCPs are provisioned with the customer's account record so that each call is processed using the same features and call logic regardless of which NCP is used to process the call. 8YY calls are received at one of the 16 pairs of Advanced 8YY Network Control Point (NCP-A800) databases. The NCP processes queries received from the switch and responds back with a reply message. The switch uses the announcement information in the reply to redirect the call to a courtesy response announcement.

Yet another enhancement is the use of the preexisting call allocator feature to distribute announcement traffic between D and S set announcement resources within the announcement frame 240. The call allocator feature within the customer's routing plan is used to load share traffic between the two different announcement sets within the AT&T network.

When the NCP reply message is received by the originating 4E switch the call is directed to the announcement resource 240 within the switch and the caller is played an announcement acknowledging the receipt of the call. In order to evenly distribute calls between the S and D set announcement resources, the call allocator feature is used in the customer record to alternate calls between the two announcement sets. Traffic to these announcement sets will route to two overflow options in the network before being blocked. This capability may be available using either the standard architecture of FIG. 1 or the mass calling event architecture of FIG. 2. Once the caller hears the short courtesy response announcement the call is ended. Call completion data is collected and forwarded to the customer after the event.

Together, the above-described improvements have increased the throughput of the standard AT&T Advance 8YY network architecture from a maximum of 8 million calls to approximately 30 million call attempts using that network design.

Figure 3:
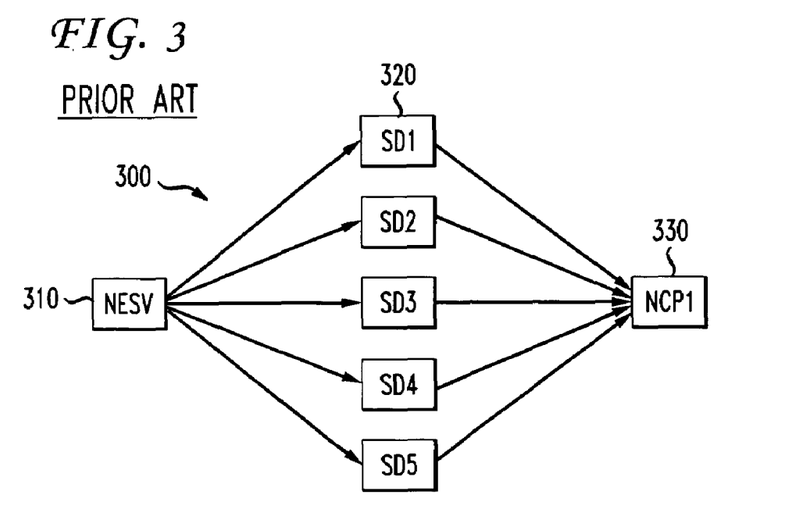
FIG. 3 is a schematic representation of a prior art communications network.

An existing architecture 300 used in current network edge switch systems is shown in FIG. 3. Calls received by network edge switches (NESVs) 310 are referred to segmentation databases such as SD 320. The network edge switch (NESV)

310 uses a "round robin" distribution identify an SD for a particular call; i.e., sequential received calls are assigned to SDs in a repeating sequence.

All SDs 320 are identical, containing a service processor index (SPI) that identifies a particular NCP 330 for routing calls associated with a particular 8YY customer. Therefore, during a mass calling event, all calls for a given 8YY number account will be directed to the same NCP 330. The NCP may be a bottleneck during a high volume event.

Other systems have been proposed for overcoming the congestion problem triggered by a telephone voting event. For example, U.S. Pat. No. 6,768,895 discloses a mobile telephone voting system wherein a polling server authorizes only a predetermined percentage of incoming voting calls. The percentage is increased or decreased in subsequent rounds based on a statistical analysis of the previous results. In that way, the polling server may be scaled down and network congestion is reduced.

While the above improvements have been effective, there remains a need for a telephonic voting system that may be used to record opinion during a national or widely-viewed event, while further minimizing network congestion caused by the voting calls.

SUMMARY OF THE INVENTION

The present invention addresses the needs described above by providing a method and system for collecting ballots in a telephony-based polling system. In one embodiment of the invention, a telephony-based system is provided for processing ballots cast using 8YY calls during a mass polling event in a telecommunications network. The system includes a plurality of network control points (NCPs). The NCPs comprise substantially identical databases containing 8YY call routing information. The system also includes a plurality of segmentation databases (SDs), each SD being configured for routing received 8YY calls to NCPs in a repeating sequence of said NCPs. Each of the SDs routes to a different sequence of NCPs. The system further includes a network edge switch (NES) connected for receiving the 8YY calls from a local exchange carrier (LEC); the NES configured for routing sequentially received calls to a repeating sequence of SDs.

That system may further include a plurality of 4ESS switches configured for routing 8YY calls to said NCPs. Moreover, the system may further comprise an announcement frame connected to the NES, where the announcement frame includes an announcement set stored in disk cache.

The NES may be connected for receiving calls from a local exchange carrier. The SD may include a service processor table, the service processor table containing routing information for routing sequentially received 8YY calls to a repeating sequence of the NCPs.

The 8YY calls may be routed to individual NCPs of NCP pairs. The system may further include a plurality of NESs, such that each NES is configured to route to a unique set of SDs.

Another embodiment of the invention is a method for balancing call traffic in a telephony-based voting system. In the system, ballot calls received by switches are mapped through signal transfer points (STPs), each STP having links to network control points (NCPs).

The method comprises the steps of mapping calls received by a first group of switches to NCPs through a first group of STPs in a home region linked by AA links to the NCPs, and mapping calls received by a second group of switches to NCPs through a second group of STPs in a home region linked by A links to the NCPs. The method also includes the steps of selecting NCPs to which switches within the first group of switches are mapped, to balance loads on the AA links linking the home region of the first group, and selecting NCPs to which switches within the second group of switches are mapped, to balance loads on the A links linking the home region of the second group.

The selecting steps may include selecting NCPs to minimize a number of switches linked by any one link. The switches may be 4ESS switches.

The NCPs to which switches within the first group of switches are mapped may be contained in geographic regions different from geographic regions containing NCPs to which switches within the second group of switches are mapped. The ballot calls may be 8YY calls.

Yet another embodiment of the invention is a method for processing ballot calls in a network-based voting system. That method includes the steps of caching announcements in a disk cache of an ISAIC announcement node, receiving a ballot call at a switch, sending from the switch to a network control point (NCP) a signaling query, receiving at the switch a reply message from the NCP including announcement information, and in accordance with the announcement information, selecting an announcement from the cached announcements and playing it to a caller.

The switch may be a 4ESS switch, and the ballot call may be an 8YY call. The dialed number of the ballot call may identify a ballot choice. The selected announcement may confirm a ballot choice.

DESCRIPTION OF THE INVENTION

The inventors have identified several improvements to the current network architecture for handling the mass calling events triggered by polling television shows and other similar circumstances. The improvements increase the network call throughput, thereby increasing the number of that can be received and processed during an event. The three improvements are discussed in the following three sections of the disclosure:

Round-Robin Routing to NCPs

Figure 4:
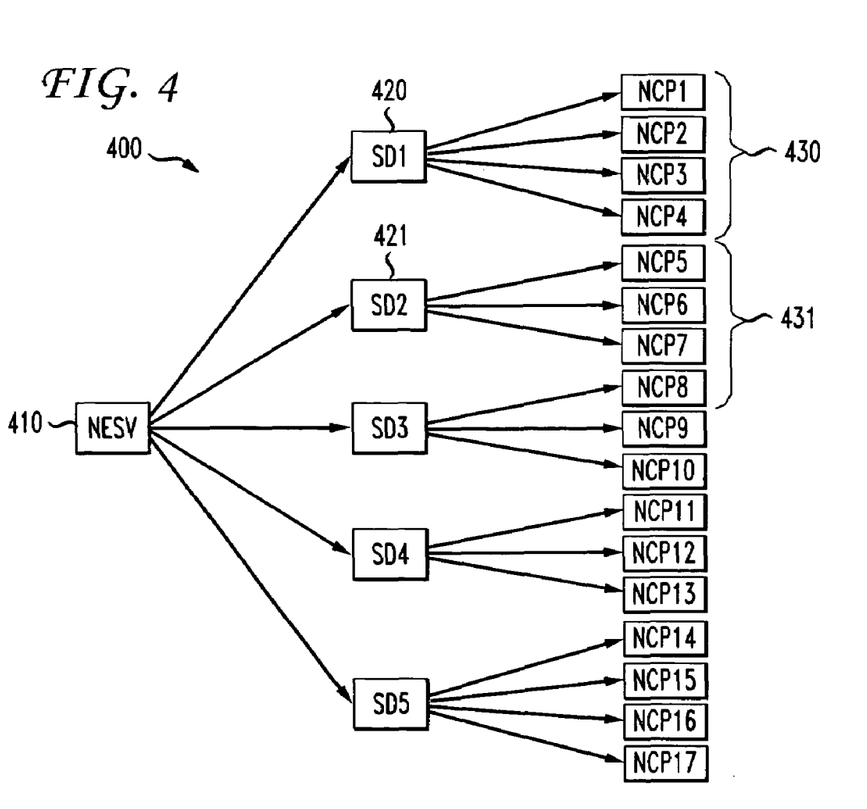
FIG. 4 is a block diagram showing a communications network architecture according to one embodiment of the invention.

An exemplary embodiment of a system 400 according to the present invention is shown in FIG. 4. That embodiment involves calls originating from a LEC network to network edge switches 410. For example, the network edge switches may be 5E and DMS switches.

The calls are processed first through the edge architecture using a segmentation database such as segmentation database (SD1) 420, before being up-chained to the 4ESS network.

The segmentation database (SD) is used in the edge architecture to distribute calls to the appropriate 2NCP application for call processing. To improve the load distribution of the 8YY calls originating from the network edge switches to the 2NCPs during mass calling events, a new way of configuring the service processor table within the SD application is used. The configuration improves network throughput on edge-based calls by using a uniquely configured service processor table in all SDs. In that way, calls routed to a given SD such as SD 420 are distributed in "round-robin" fashion to a first group of NCPs 430, while calls routed to another SD such as SD2 421 are distributed in round-robin fashion to a second group of NCPs 431.

As used herein, the term "round robin" means that the calls are distributed in sequence to a series of SDs. Once a call attempt has been routed to each SD in the series, the distribution of calls starts again at the beginning of the series. Traffic associated with any one 8YY account through the NCPs may thereby be distributed among several NCPs, reducing bottlenecks that might otherwise occur in the configuration shown in FIG. 3.

Leveling a Link and AA Link Mapping

AT&T's SS7 signaling network includes several network elements that support mass calling events such as telephone balloting events. Three of the key elements are the 4ESS, 2STP, and 2NCP. In the past, AT&T implemented an A/AA link routing scheme to minimize the effect of a 2STP pair failure serving a 2NCP. A-links connect the NCP to its home STP region whereas the AA-links (alternate access) connect it to an alternate STP region for increased reliability. For mass calling events, that scheme routed the 8YY queries to the 2NCPs based simply on the originating 4E and the 2STP that serves that 4E. The call is ultimately delivered to the 2NCP via the A or AA links.

Figure 5:
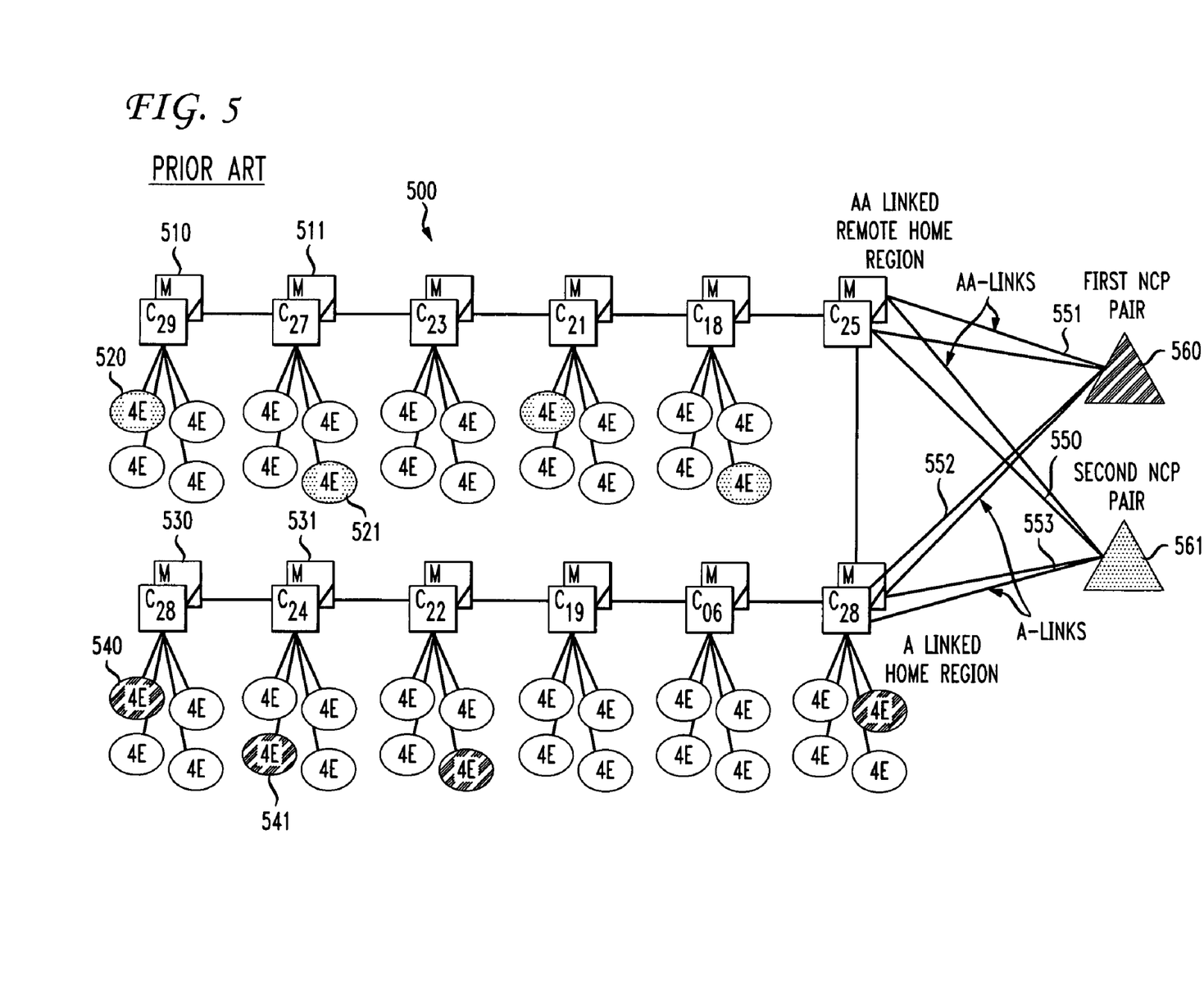
FIG. 5 is a schematic representation of a prior art communications network.

FIG. 5 is a diagram depicts a prior art scheme including the high level 2NCP to 2STP region assignment for A/AA link assignments. The figure shows the detail of a specific 2NCP pair 550, 551 and all the 2STP region assignments for that pair. In this example, 2STP regions 29, 27, 23, 21, 18, and 25 all utilize the AA links (under normal conditions) where as 2STP regions 28, 24, 22, 19, 06, and 28 utilize the A links. 4E switches such as switches 520, 521, 540, 541 are connected to 2STP pairs such as pairs 510, 511, 530, 531.

The STP pairs 510, 511 utilize AA link 551 to connect with a first NCP pair 560 and utilize AA link 550 to connect with a second NCP pair 561. Similarly, the STP pairs 530, 531 utilize A link 552 to connect with a first NCP pair 560 and utilize A link 553 to connect with a second NCP pair.

The prior art scheme 500 of FIG. 5 has been used to support mass calling events in an STP/NCP network. The 4E switches are mapped to NCP pairs based on balancing the 4E query volume to the total volume a 2NCP could accommodate during a particular time period, and on the location and time zone of the 4Es. Using those criteria, the shaded 4Es in the example, including 4Es 520, 521, are all mapped to the second NCP pair 561. Likewise, the crosshatched 4Es, including 4Es 540, 541, are all mapped to the first NCP pair 560, also based on the 4E load and location criteria.

In the example of FIG. 5, the capacity of the A links and AA links was not considered in mapping the 4Es to the NCPs. It can be seen that the AA link 550 carries calls from all four shaded 4Es, while the AA link 551 carries no calls from the shaded 4Es. Similarly, the A link 552 carries all calls from the crosshatched 4Es, while the A link 553 carries none. In the example of FIG. 5, loads among the A links may be unbalanced and loads among the AA links may unbalanced, depending upon the distribution of loads among the 4Es.

The inventors discovered that, due to A/AA link routing, certain 2NCPs were being overloaded on a particular link type due to the assignments based on the original 2NCP capacity only scheme. The inventors recognized that traffic could be manipulated to better utilize the spare capacity on those links to increase network throughput and reduce congestion on the A-links and AA links of each machine.

The inventors have therefore devised an improved scheme where the 4Es are mapped to a 2STP region, and then the 2STP regions are mapped to link type (A vs. AA), for a single 2NCP. The query volume is also applied by time period. That results in a distribution of originating traffic based on time, query volume, A/AA link capacity, and 2NCP query capacity.

Based on historical traffic data collected during past mass calling events, the network programmer considers the home STP region of the 4E as well as originating traffic load from the switch before mapping it to a 2NCP in an effort to load balance the traffic between the AA-links and A-links of the 2NCP. That new network configuration dramatically reduces link congestion.

Figure 6:
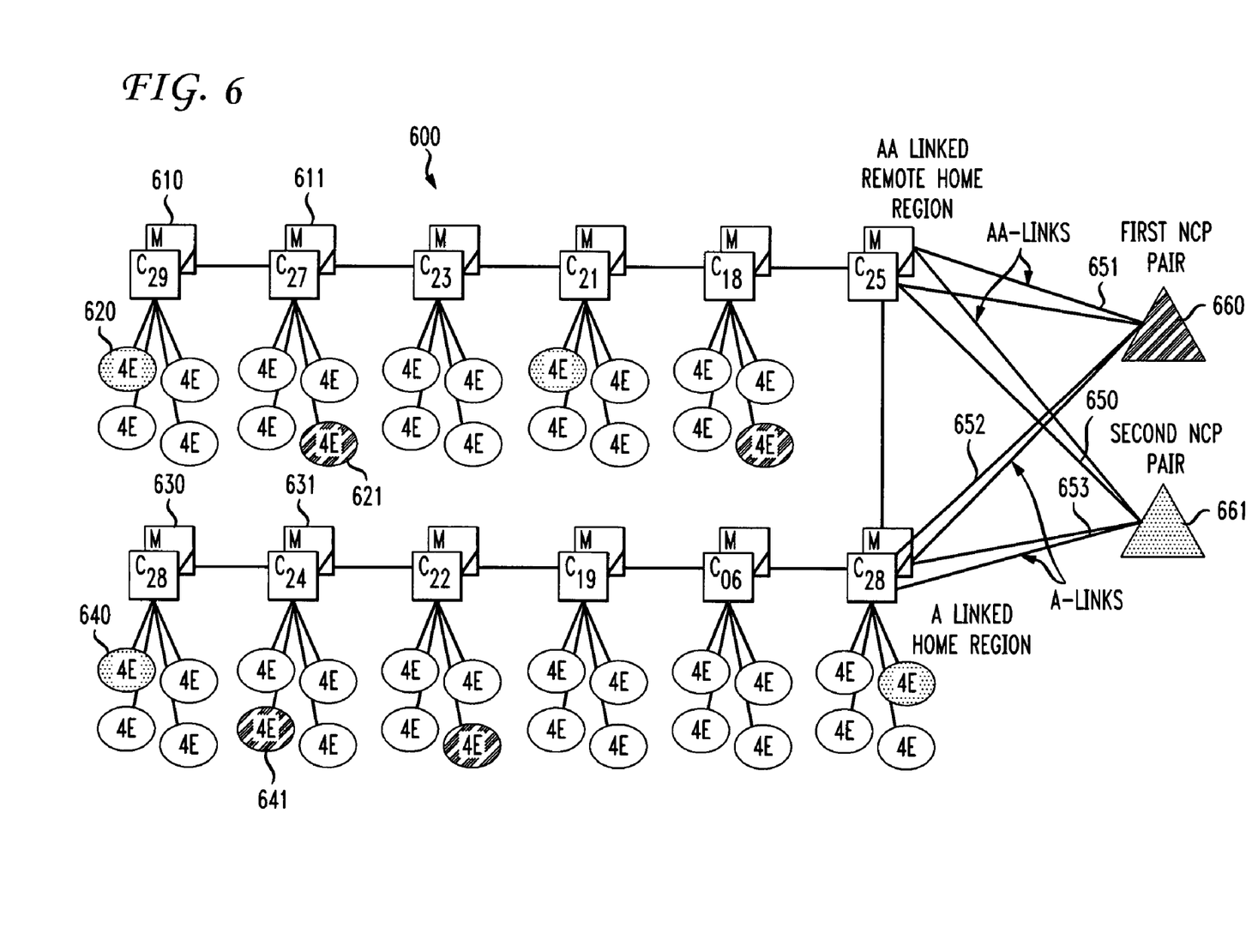
FIG. 6 is a block diagram showing a communications network architecture according to one embodiment of the invention.

An exemplary network 600 showing the improved mapping of the invention is shown in FIG. 6. As in the prior art network of FIG. 6, 4E switches such as switches 620, 621, 640, 641 connect through 2STP pairs such as pairs 610, 611, 630, 631 and through links 651, 650, 652, 653, to access NCP pairs 660, 661. In the improved network architecture of FIG. 6, however, the 4E switches are mapped to the NCP pairs in a way that better utilizes the A links and the AA links.

Specifically, shaded 4E switches such as switch 620 in the AA-linked remote home region (the region including 2STP 610) are mapped to the second NCP pair 661, while the cross-hatched 4E switches such as switch 621 are mapped to the first NCP pair 660. In that way, load originating from the 4E switches in that home region may be balanced among several AA links 650, 651. For example, using historic data from those 4E switches, the network designer may now allocate the expected load in a mass calling event between the two AA links 650, 651 shown.

Similarly, call loads from shaded 4E switch 640 in the A-linked home region are mapped through 2STP 630 to the second NCP pair 661, while call loads from crosshatched 4E switch 641 are mapped through 2STP 631 to the first NCP pair 660. Call load on the A linked home region is therefore similarly balanced among the links, greatly increasing throughput.

The arrangement shown in FIG. 6 therefore more efficiently allocates call traffic over the A links and AA links, permitting increased volume without adding link capacity. While the 2NCP could handle the total traffic load, the A and AA links would otherwise go into overload, blocking originating calls.

Announcement Caching

Another enhancement made by the inventors to the existing network architecture involves caching of announcements in the ISAIC announcement nodes in the network. The caching of announcements increases the ability of the existing network to handle the increased call traffic of a mass calling event by reducing the time it takes to invoke a courtesy response announcement by about one-half second.

Figure 7:
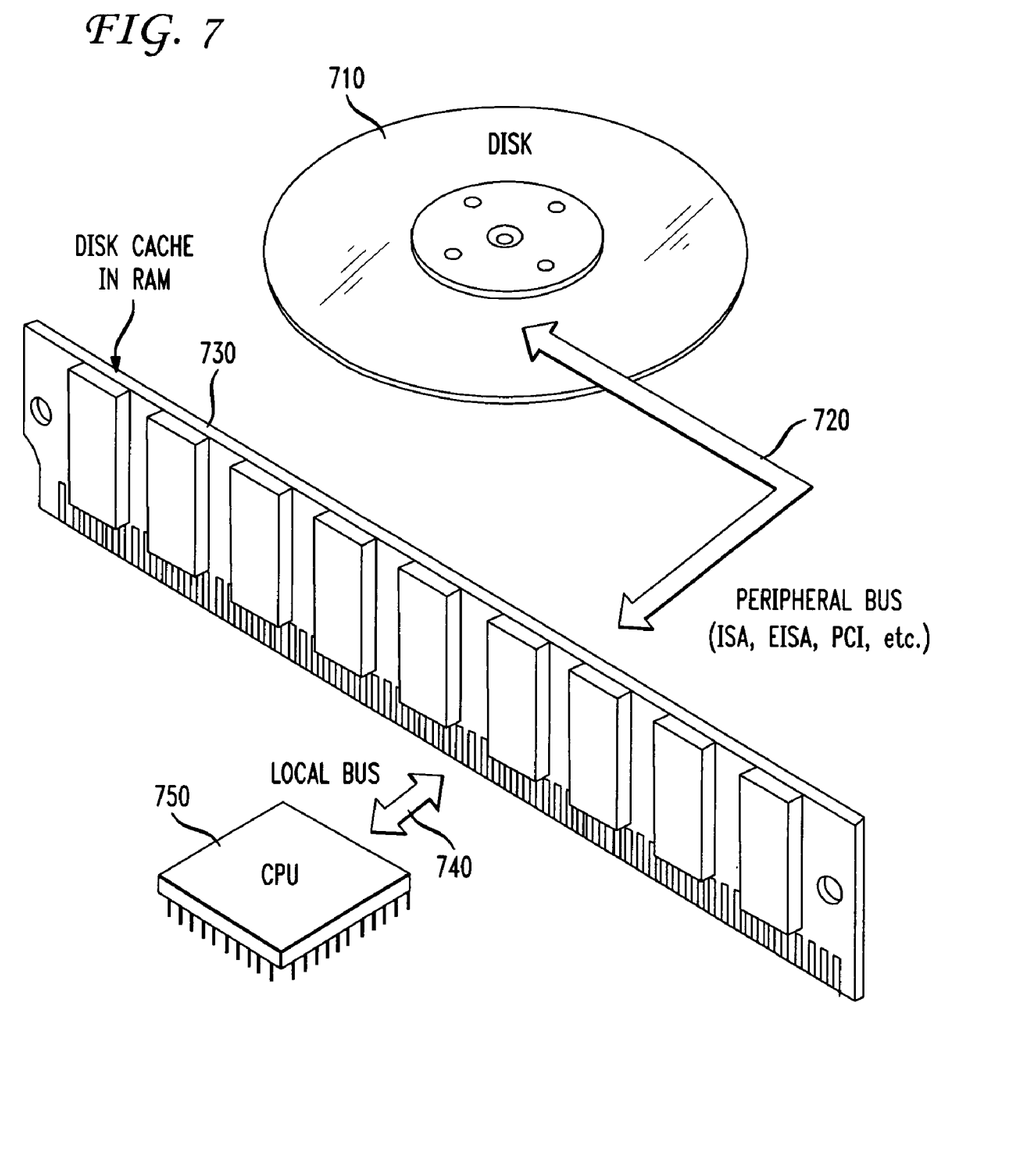
FIG. 7 is a schematic diagram showing a system hardware arrangement including disk cache memory.

As shown in the partial schematic diagram of FIG. 7, a disk cache 730 is a section of main memory or memory on the disk controller board that bridges a disk 710 through the peripheral bus 720 and the CPU 750 through the local bus 740. Whereas memory caches (CPU caches) use higher-speed static RAM (SRAM) chips, disk caches are usually just a part of main memory made up of common dynamic RAM (DRAM) chips.

When the disk 710 is read, as during system configuration or start-up, a larger block of data is copied into the cache 730 than is immediately required. That block of data includes the announcement scripts needed by the ISAICS nodes that are related to an expected mass calling event. If a subsequent read during a call finds the data already stored in the cache 730, there is no need to retrieve it from the disk 710, which is slower to access.

Caching of announcements is not done in 8YY telecommunications networks under normal circumstances. By caching those announcements needed to service a mass calling event, it is estimated that announcement capacity increases by 20%.

The network improvements discussed above increase the throughput of the standard Advance 8YY network architecture from a maximum of 8 million calls to close to 70 million call attempts during a mass calling event such as a telephonic poll triggered by a televised announcement.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein with respect to a mass polling event triggered by a televised announcement, the method and apparatus of the invention may be used with any situation involving increased network traffic, such as an emergency or a holiday. It is to be understood that the embodiments shown and described herein are only illustrative of the principles of the present invention and that various modifications may be implemented by those skilled in the art without departing from the scope and spirit of the invention.

What is claimed is:

1. A telephony-based system for processing ballots cast using 8YY calls during a mass polling event in a telecommunications network, comprising:
    a plurality of network control points (NCPs), each NCP comprising a substantially identical database containing 8YY call routing information;
    a plurality of segmentation databases (SDs), each SD configured for routing received 8YY calls to NCPs in a repeating sequence of said NCPs, each SD routing to a different sequence of NCPs; and
    a network edge switch (NES) connected for receiving the 8YY calls; the NES configured for routing calls to a repeating sequence of SDs.

2. The system of claim 1, further comprising a plurality of 4ESS switches, each configured for routing 8YY calls to a mapped one of said NCPs.

3. The system of claim 1, further comprising an announcement frame connected to said NES, said announcement frame including an announcement set stored in disk cache.

4. The system of claim 1 wherein the NES is connected for receiving calls from a local exchange carrier (LEC).

5. The system of claim 1 wherein each of the SDs comprises a service processor table, the service processor table containing routing information for routing sequentially received 8YY calls to a repeating sequence of NCPs.

6. The system of claim 1 wherein said 8YY calls are routed to individual NCPs of NCP pairs.

7. The system of claim 1, further comprising a plurality of NESes, each NES configured to route to a unique set of SDs.

8. A method for balancing call traffic in a telephony-based voting system wherein ballot calls received by switches are mapped through signal transfer points (STPs), each STP having links to network control points (NCPs), the method comprising the steps of:
    mapping calls received by a first group of switches to NCPs through a first group of STPs in a home region linked by AA links to the NCPs;
    mapping calls received by a second group of switches to NCPs through a second group of STPs in a home region linked by A links to the NCPs;
    selecting NCPs to which switches within the first group of switches are mapped, to balance loads on the AA links linking the home region of the first group; and
    selecting NCPs to which switches within the second group of switches are mapped, to balance loads on the A links linking the home region of the second group.

9. The method of claim 8 wherein the selecting steps include selecting NCPs to minimize a number of switches linked by any one link.

10. The method of claim 8, wherein the switches are 4ESS switches.

11. The method of claim 8 wherein the NCPs to which switches within the first group of switches are mapped are contained in geographic regions different from geographic regions containing NCPs to which switches within the second group of switches are mapped.

12. The method of claim 8, wherein the ballot calls are 8YY calls.

* * * * *